United States Patent

[11] 3,545,722

| [72] | Inventors | Robert J. Bovio<br>Lowell;<br>William A. Finch, Marblehead,<br>Massachusetts |
|---|---|---|
| [21] | Appl. No. | 776,511 |
| [22] | Filed | Nov. 18, 1968 |
| [45] | Patented | Dec. 8, 1970 |
| [73] | Assignee | Sylvania Electric Product Inc.<br>a corporation of Delaware |

[54] VACUUM VALVE WITH SPRING BIASED PLASTIC DIAPHRAGM
2 Claims, 4 Drawing Figs.

| [52] | U.S. Cl. | 251/331, 251/251 |
|---|---|---|
| [51] | Int. Cl. | F16k 7/16 |
| [50] | Field of Search | 251/331, 251 |

[56] References Cited
UNITED STATES PATENTS

| 2,074,240 | 3/1937 | Saunders | 251/331X |
|---|---|---|---|
| 2,675,758 | 4/1954 | Hughes | 251/331X |
| 3,134,570 | 5/1964 | Jarrett | 251/331 |
| 3,399,695 | 9/1968 | Stehlin | 251/331X |

*Primary Examiner*—Arnold Rosenthal
*Attorneys*—Norman J. O'Malley and Laurence Burns ABSTRACT: An improved diaphragm arrangement for mechanical valves for vacuum systems where corrosive gases are present. The diaphragm and its related tip are made in a one-piece construction from a fluorocarbon plastic composition. This improved molded structure provides a diaphragm closure thaT is uneffected by corrosive gases and can be flexed almost indefinitely without rupturing.

PATENTED DEC 8 1970
3,545,722
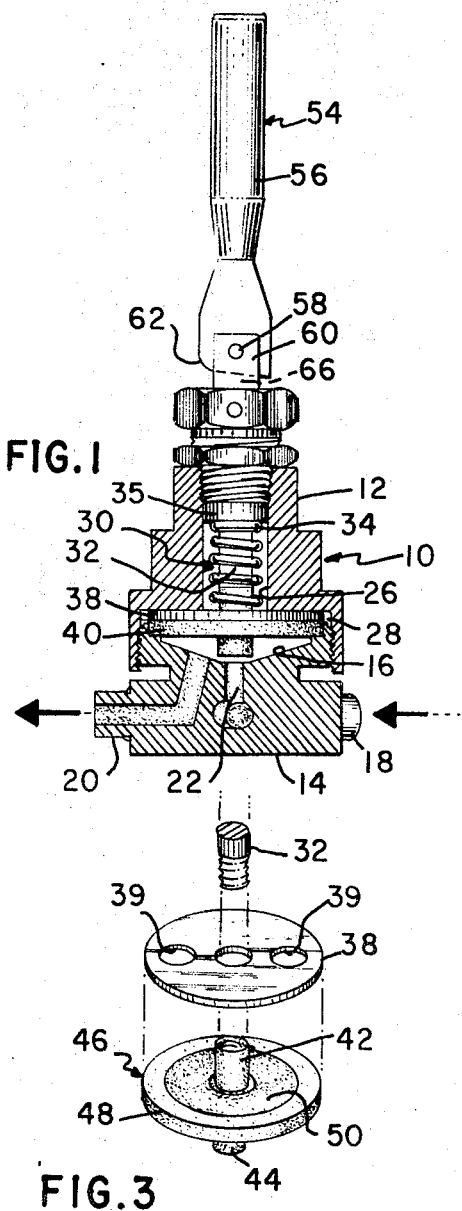
FIG. 1
FIG. 3
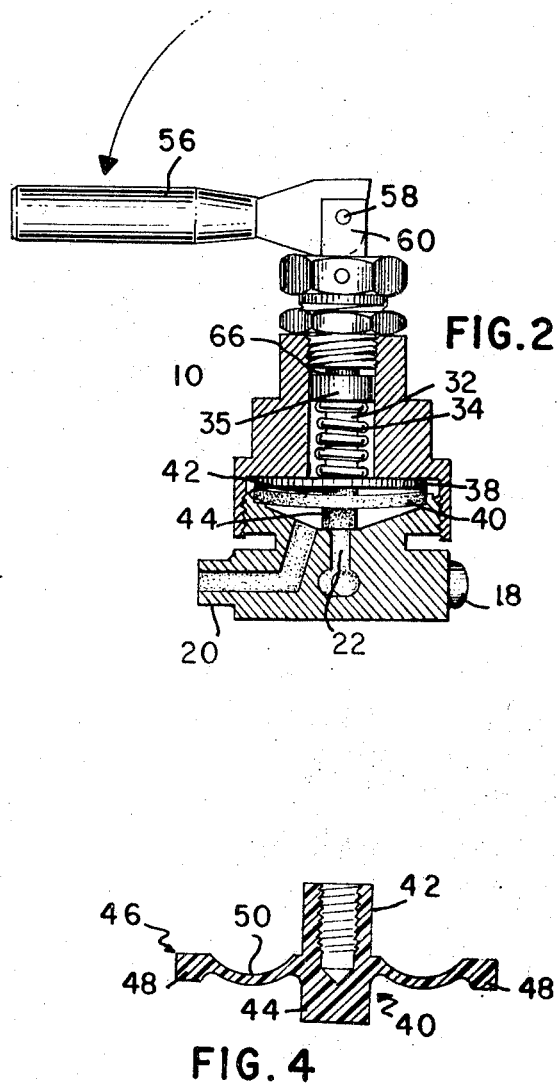
FIG. 2
FIG. 4
ROBERT J. BOVIO
WILLIAM A. FINCH
INVENTORS
BY Lawrence Burns,
ATTORNEY

VACUUM VALVE WITH SPRING BIASED PLASTIC DIAPHRAGM

FIELD OF THE INVENTION

This invention relates generally to valves and more particularly to mechanical valves used in vacuum systems in which corrosive gases such as bromine and iodine are present. More specifically it relates to an improvement in the internal components of valves.

PRIOR ART

Various closures are used for valves in vacuum systems, the main one employs a diaphragm that flexes to move an attached closure tip to seal off the supply inlet of the valve. The purpose of the diaphragm is to act as a seal and also to prevent gases from leaking back up through the system. The diaphragm is usually made of stainless steel or an equivalent and is permanently affixed within the valve body.

Regardless of the type of valve which is used the same problems occur with the components, that is, they are readily corroded by the gases and they are not easy to replace. The diaphragm utilizes a thin gage stainless steel as a flexible component for the closure tip and is permanently affixed to a valve plunger shaft by solder or a braze, thus making replacement of the individual parts almost impossible. Since thin stainless steel is used, minute cracks appear along the lines of the flexing and the corrosive gases will in time enlarge these cracks and cause failure of the valve diaphragm. Also, in this corrosive environment, the solder and brazed joints are effected, thereby weakening the whole valve.

Standard closures include several separate parts which makes the valve rather costly as well as troublesome to repair. In the assembly of the conventional diaphragm valve, a short main threaded plunger shaft is used to hold a thin stainless steel diaphragm which is provided with a receiver on its upper surface and a screw stud on its bottom surface. The diaphragm is then fitted to a plunger shaft and is permanently soldered in place. A closure tip, usually of stainless steel, is then screwed to the lower screw stud of the diaphragm to form the complete closure unit. Located between the top of the diaphragm along the plunger shaft are a series of operational parts that are stacked over the shaft. A stiffener washer, a limit washer and a compression spring, in that order, are fitted over the shaft to bear against the top part of the diaphragm and are held tightly against the top part of the diaphragm by a tension bushing screwed to the top end of the shaft. This complete assembly is then fitted into the internal cavity of the valve and the bottom outer edges of the diaphragm contact a plastic ring washer located in the valve seat. The purposes of the limit washer lying adjacent the diaphragm, is to prevent the flexible portion of the diaphragm from rising above the horizontal line during operation. All of the above-mentioned parts are closely related to one another so that operation of the valve handle will compress the plunger shaft and compress the spring whereby the center portion of the diaphragm will be forced to flex downwardly to position its related closure tip over the inlet orifice of the valve.

SUMMARY OF THE INVENTION

In our improved valve closure, we have overcome the above-mentioned disadvantages through the use of a flexible plastic diaphragm including a closure tip. This construction can be directly screwed to the bottom end of a conventional valve plunger shaft without use of solder or braze. This diaphragm eliminates a separate closure tip and stiffener washer or the plastic ring seat washer. The diaphragm can be replaced by simply unscrewing it from the shaft thus eliminating brazed or solder joints. Even with continual operational flexing in a corrosive environment this construction provides unlimited operational flexing without breakdown.

BRIEF DESCRIPTION OF THE DRAWING

FIG. 1 is an elevational cross-sectional view of the cam-type diaphragm valve showing in particular the valve in its opened position.

FIG. 2 is an identical view as that of FIG. 1 with the valve shown in its closed position.

FIG. 3 is a perspective view of the diaphragm and limit washer and part of the valve stem.

FIG. 4 is an elevational cross-sectional view of the diaphragm.

FIG. 4 is an elevational cross-sectional view of the diaphragm.

DESCRIPTION OF THE PREFERRED EMBODIMENT

With reference to the drawings, a toggle-action-type diaphragm valve is illustrated to best show our invention.

In FIG. 1 an elevational cross section of the valve is shown in its open position, that is, an unobstructed path through the valve from an inlet to outlet port can be seen.

The valve itself is made up of a series of parts, such as the body casting 10 having an upper portion 12 and a lower portion 14. The lower portion 14 is mated to the top by a screw thread and has a conical internal cavity 16, and inlet and outlet ports 18 and 20 respectively.

The inlet port 18 emerges into a central vertical orifice 22 that terminates into lower area of the cavity 16. Thus, a path for gases can be traced from the inlet port 17 up through the central orifice 22 by way of cavity 16 to the outlet port 20.

The upper portion 12 of the valve 10 also has an upper internal cavity 26. The upper cavity 26 is smaller in diameter than the lower cavity 16. An intermediate cavity 28, larger than either upper cavity 26 or lower cavity 16, is formed where these two are joined together.

Within intermediate cavity 28 a diaphragm assembly 30 is located. This assembly is made up of five components, a plunger shaft 32, a compression spring 34, a tension bushing 36, a limit washer 38 and a plastic diaphragm 40.

The diaphragm 40 is a one-piece construction made from a fluorocarbon plastic such as "Kel-F" a Trademark item manufactured by Minnesota Mining & Manufacturing Co. of St. Paul, Minnesota or an equivalent composition. In FIG. 4, an enlarged cross section of the diaphragm itself is illustrated, where the upper center hub portion is provided with a molded extension 42 having an internal screw thread and a shorter extension tip 44 protrudes from lower hub portion. The main circular body portion 46 of the diaphragm 40 lies between the extension 42 and the tip 44 and has enlarged outer edges 48 spaced from the center by a thinner concave section 50.

The assembly of the diaphragm assembly 30 is easily accomplished through a series of simple steps done prior to fitting it into the valve cavity. The plastic diaphragm 40 is first screwed onto the bottom end of the plunger shaft 32. Thereafter the limit washer 38 is slid over the shaft and placed directly on the top of the diaphragm. The limit washer is provided with a central hole for the passage of the shaft 32 and two vent holes 39. The compression spring 34 is then positioned over the plunger shaft 32 and held against the limit washer by screwing the bushing 34 to the top end of shaft 32. This completed diaphragm assembly can then be positioned in the upper and lower cavities of the valve body. This is done by unscrewing the upper body portion 12 from the lower body portion 14 and inserting the plunger end into the top cavity 26. When the lower body portion 14 of the valve is screwed back in position the outer edges of the diaphragm 40 and limit washer 38 are held captive in the enlarged cavity 28 by the joining of the upper and lower parts.

To operate this assembly, a toggle-handle assembly 54 is positioned at the top part of the upper valve body 12. The handle 56 of the assembly is disposed upon a pivot 58 on extensions 60 and can be moved to a position as seen in FIG. 2. In this position a rounded cam edge 62 on the handle engages and moves downwardly to drive stud 66.

Depression of the stud 66 will translate the downward movement to the closure plunger shaft 32, thereby compressing spring 32 between bushing 35 and the limit washer 38 that is securely held between the bodies. This downward movement flexes the center portion of the diaphragm placing the closure tip 44 of the diaphragm over the vertical orifice 22, thereby closing off the valve. The vent holes 39 relieve the pressure that is generated by the continual flexing of the diaphragm.

It can be seen in FIG. 2, which is the closed position of the valve, that gases entering the inlet port 18 will be closed off at orifice 22 and as viewed in FIG. 1 the valve is shown opened where gases can pass from port 18 will be closed off at orifice 22 and as viewed in FIG. 1 the valve is shown opened where gases can pass from port 18 to port 20 passing through cavity 16 over the bottom surface of diaphragm 40. It also can be seen that the outer edge of the diaphragm 48 is held tightly into a ridge between cavity 16 and 26 thus preventing gases from escaping through the top by way of the handle 54.

It is apparent that changes and modifications may be made within the spirit and scope of the instant invention. It is our intention, however, to be limited only by the scope of the appended claims.

We claim:

1. A vacuum valve comprising: an upper body having a vertical bore terminating in a larger cylindrical bore; a lower body fitted to said upper body, said lower body having a conical cavity disposed therein; said conical cavity being provided with an inlet path that terminates in a central orifice and an outlet path that lies adjacent to said central orifice; a diaphragm assembly positioned in said conical cavity, said assembly including a flat flexible plastic diaphragm having a closure tip centrally disposed thereon and above said central orifice, a threaded plunger shaft, a compression spring, a limit washer, a tension bushing, said plastic diaphragm being attached to one end of said plunger shaft, said limit washer being positioned adjacent to the top portion of the said plastic diaphragm and tensioned by said compression spring and by said tension bushing disposed at the other end of said plunger shaft; a control means separate from for said diaphragm and assembly and located above said assembly, said control means adapted to contact and flex said plastic diaphragm to place said closure tip of said diaphragm over said central orifice whereby said inlet path can be closed off.

2. The valve according to claim 1 wherein said plastic diaphragm has a peripheral disc portion and a molded hub portion, said hub portion having, on one side, an internal screw thread and on the other side, said closure tip which extends from the lower surface of said diaphragm; said peripheral disc portion being spaced from said hub portion and spaced from the central portion by a thin concave section; said diaphragm being attached to said threaded plunger shaft.